(12) United States Patent
Lesea

(10) Patent No.: US 8,117,497 B1
(45) Date of Patent: Feb. 14, 2012

(54) METHOD AND APPARATUS FOR ERROR UPSET DETECTION AND CORRECTION

(75) Inventor: Austin H. Lesea, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 511 days.

(21) Appl. No.: 12/247,916

(22) Filed: Nov. 17, 2008

(51) Int. Cl.
*G06F 11/00* (2006.01)

(52) U.S. Cl. ........... 714/30; 714/6.1; 714/6.12; 714/6.2; 714/34; 714/38.13

(58) Field of Classification Search .............. 714/30, 714/34, 38.13, 6.1, 6.12, 6.2
See application file for complete search history.

(56) References Cited

U.S. PATENT DOCUMENTS

| | | | | |
|---|---|---|---|---|
| 6,119,246 | A * | 9/2000 | McLaughlin et al. | 714/27 |
| 6,408,417 | B1 * | 6/2002 | Moudgal et al. | 714/764 |
| 6,550,022 | B1 * | 4/2003 | Faver | 714/34 |
| 6,804,799 | B2 * | 10/2004 | Zuraski, Jr. | 714/54 |
| 7,263,631 | B2 * | 8/2007 | VanBuren | 714/15 |
| 7,467,326 | B2 * | 12/2008 | Hillman et al. | 714/11 |
| 7,576,557 | B1 * | 8/2009 | Tseng et al. | 326/9 |
| 2004/0199813 | A1 * | 10/2004 | Hillman et al. | 714/13 |
| 2006/0036909 | A1 * | 2/2006 | VanBuren | 714/15 |

OTHER PUBLICATIONS

Lovelette, M. N. et al., "Strategies for Fault-Tolerant, Space-Based Computing: Lessons Learned from the Argos Testbed," *Proceedings of the 2002 IEEE Aerospace Conference Proceedings*, Mar. 2002, pp. 5-2109 to 5-2119, vol. 5, Big Sky, Montana, USA.
Oh, Nahmsuk et al., "Control-Flow Checking by Software Signatures," *IEEE Transactions on Reliability*, vol. 51, No. 2, Mar. 2002, pp. 111-122.
Shirvani, Philip P. et al., "Software-Implemented EDAC Protection Against SEUs," *IEEE Transactions on Reliability*, vol. 49, No. 3, Sep. 2000.

* cited by examiner

*Primary Examiner* — Robert Beausoliel, Jr,
*Assistant Examiner* — Charles Ehne
(74) *Attorney, Agent, or Firm* — Michael T. Wallace; LeRoy D. Maunu; Thomas George

(57) ABSTRACT

A method and apparatus for the detection and correction of soft errors existing within an integrated circuit (IC). Run-time check stops are utilized in conjunction with processor-based, hardware mechanisms to detect and correct soft errors. At run-time, each check stop facilitates a snap shot of the hardware and/or software state of the IC to be stored into hardware and/or software based memory. Should a soft error be detected, execution is halted and the executable state of the IC that conforms to a previous check-stop location may be re-established after the soft error(s) are optionally corrected. In alternate embodiments, hardware based mechanisms may be exclusively utilized to both detect and correct the soft errors.

18 Claims, 7 Drawing Sheets

METHOD AND APPARATUS FOR ERROR UPSET DETECTION AND CORRECTION

FIELD OF THE INVENTION

The present invention generally relates to error upset detection and correction, and more particularly to software and/or hardware based error upset detection and correction within an integrated circuit.

BACKGROUND OF THE INVENTION

With the ever decreasing geometric size of features contained within semiconductor devices, susceptibility to single event upset (SEU) failure becomes increasingly prominent. In particular, neutron induced SEUs have a greater impact as feature geometries of the semiconductor devices are reduced, since the relative size of the neutron with respect to the semiconductor based feature grows. As such, neutrons that are incident to a silicon nucleus of a semiconductor device within a particular feature may induce an alpha particle to be released by the semiconductor device. Once the alpha particle is released, its ionic polarization may be such that a logic state of the semiconductor device is "flipped", or reversed.

SEU failures may manifest themselves as soft errors within, for example, a configuration memory cell of a programmable logic device (PLD). In such an instance, the SEU may cause a soft failure, which is to say that the failure may be recoverable by executing a reconfiguration of the PLD's configuration memory. Conversely, however, the SEU may cause a catastrophic failure, in instances where reconfiguration of the configuration memory is not possible, or where some non-recoverable failure has occurred. PLDs, therefore, are particularly prone to SEU failure, since reversal of the logic state of one or more configuration memory cells may render the PLD unusable for its intended purpose.

One type of PLD, the Field Programmable Gate Array (FPGA), typically includes an array of programmable tiles that may be configured by a group of configuration memory cells. These programmable tiles can include, for example, Input/Output Blocks (IOBs), Configurable Logic Blocks (CLBs), dedicated Random Access Memory Blocks (BRAM), multipliers, Digital Signal Processing blocks (DSPs), processors, clock managers, Delay Lock Loops (DLLs), Multi-Gigabit Transceivers (MGTs) and so forth.

Each programmable tile typically includes both programmable interconnect and programmable logic that are configured by the logic contained within the corresponding configuration memory cells. The programmable interconnect typically includes a large number of interconnect lines of varying lengths interconnected by Programmable Interconnect Points (PIPs). The programmable logic implements the logic of a user design using programmable elements that may include, for example, function generators, registers, arithmetic logic, and so forth.

The programmable interconnect and the programmable logic are typically programmed by loading a stream of configuration data into the configuration memory cells during a configuration event that defines how the programmable elements are configured. The configuration data may be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these PLDs, the functionality of the device is controlled by the configuration data bits provided to the device for that purpose. The configuration data bits can be stored in volatile memory (e.g., static memory cells, as in FPGAs and some CPLDs), in non-volatile memory (e.g., FLASH memory, as in some CPLDs), or in any other type of memory cell.

Some PLDs, such as the Xilinx Virtex® FPGA, can be further programmed to incorporate blocks with pre-designed functionalities, i.e., "cores". A core can include a predetermined set of configuration data bits that program the FPGA to perform one or more functions. Alternatively, a core can include source code or schematics that describe the logic and connectivity of a design. Typical cores can provide, but are not limited to, DSP functions, memories, storage elements, and math functions. Some cores include an optimally floor planned layout targeted to a specific family of FPGAs. Cores can also be parameterizable, i.e., allowing the user to enter parameters to activate or change certain core functionality.

Design mitigation techniques, such as triple redundancy, have been employed within application specific integrated circuits (ASICs) and application specific standard products (ASSPs) to counteract the effects of soft-error based failures. Such mitigation techniques, however, may not be particularly optimal for PLD based applications, since configuration memory cell failures are unique to PLD based applications and, therefore, require the implementation of unique mitigation techniques.

Efforts continue, therefore, to implement soft-error based failure mitigation within integrated circuits such as PLDs that are optimally implemented within PLD based applications.

SUMMARY OF THE INVENTION

To overcome limitations in the prior art, and to overcome other limitations that will become apparent upon reading and understanding the present specification, various embodiments of the present invention disclose a method and apparatus for soft-error upset detection and correction within integrated circuits such as programmable logic devices.

In accordance with one embodiment of the invention, a method of detecting and correcting soft-error upsets within an integrated circuit comprises installing a plurality of check stops into a source code definition of a processor executable application and executing the processor executable application, where the plurality of check stops of the processor executable application are executed at programmable time intervals. The method further comprising collecting state information related to the integrated circuit in response to execution of each of the plurality of check stops and halting the processor executable application in response to an interrupt, the interrupt being generated in response to detecting a soft-error upset. The method further comprising correcting the soft-error upset and reinstating execution of the processor executable application, where the execution is reinstated with state information collected during one of the executed plurality of check stops.

In accordance with another embodiment of the present invention, a soft-error detection and correction system comprises a processor contained within an integrated circuit, where the processor is adapted to execute an application to gather a first set of data relative to a state of the integrated circuit at programmable time intervals. The soft-error detection and correction system further comprises a logic module that is coupled to the processor, the logic module being adapted to interrupt execution of the application upon detection of an error contained within a second set of data. The processor is further adapted to correct the error detected in the second set of data in response to the interruption of execution of the application.

In accordance with another embodiment of the present invention, an integrated circuit comprises a first memory block and a second memory block that is coupled to the first memory block. The integrated circuit further comprises a processor that is coupled to the first and second memory blocks, the processor being adapted by an application executing on the processor to transfer portions of the first memory block into the second memory block at programmable intervals. The transferred portions are confirmed as being correct and are time-stamped with a time that is indicative of the programmable interval. The integrated circuit further comprises interrupt logic that is coupled to the processor and is adapted to halt execution of the application in response to a detection of an error within the first memory block. The processor is further adapted to overwrite the first memory block with contents of the second memory block in response to the halted execution of the application.

BRIEF DESCRIPTION OF THE DRAWINGS

Various aspects and advantages of the invention will become apparent upon review of the following detailed description and upon reference to the drawings in which.

DETAILED DESCRIPTION

Generally, various embodiments of the present invention provide a method and apparatus for the detection and correction of soft errors that may be caused by single event upsets (SEUs). In one embodiment, software compilation and run-time techniques are utilized in conjunction with hardware based mechanisms to detect and correct soft errors that may have been caused by SEUs. In such an embodiment, software utilities that are compiled and executed using on-board processor(s) implemented within, for example, a programmable logic device (PLD) allow for so-called "check stops" to be compiled into the executable utility.

At run-time, each check-stop execution facilitates a snap shot of the hardware and/or software state of the PLD to be stored into hardware and/or software based memory. Each snap shot may be triggered by any number of triggering mechanisms, such as the expiration of a pre-determined amount of time, the execution of a pre-determined number of execution cycles, etc. Should an error be detected, execution may be halted, the soft error may be corrected, and the executable state of the PLD that conforms to the most recently confirmed check-stop location may be re-established. As such, only those operations executed since the most recently confirmed check-stop execution need to be re-executed, since reliable execution is substantially guaranteed prior to the most recently check-stop location. In alternate embodiments, hardware based mechanisms may be exclusively utilized to both detect and correct errors that may have been SEU induced.

In a first soft-error protected embodiment, error detection/correction procedures may be utilized to detect and correct cache errors by replacing corrupted cache content with the contents of external memory. In such an embodiment, the external memory may be structured as error correcting code (ECC) memory, also known as error detection and correction (EDAC) protected memory, so that the cache may be replaced with reliable content.

Hardware/software based recovery mechanisms in accordance with the present invention are particularly useful when utilized in PLDs, since configuration memory errors may also be detected and mitigated by providing the correct configuration information to the PLD control points that define a particular design. The contents of the corrupted configuration memory cells may be corrected through the use of ECC logic, or through the use of block-wise CRC techniques in combination with configuration memory scrubbing procedures. Similar techniques may also be utilized to substantially insure error-free operation of other memory devices within the PLD, such as random access memory blocks that may be implemented within the PLD. Frequency of use of the techniques provided herein may be on the order of seconds, minutes, hours, or even days depending upon the frequency of occurrence of soft errors that occur in the particular environment that the PLD is operating within.

Figure 1:
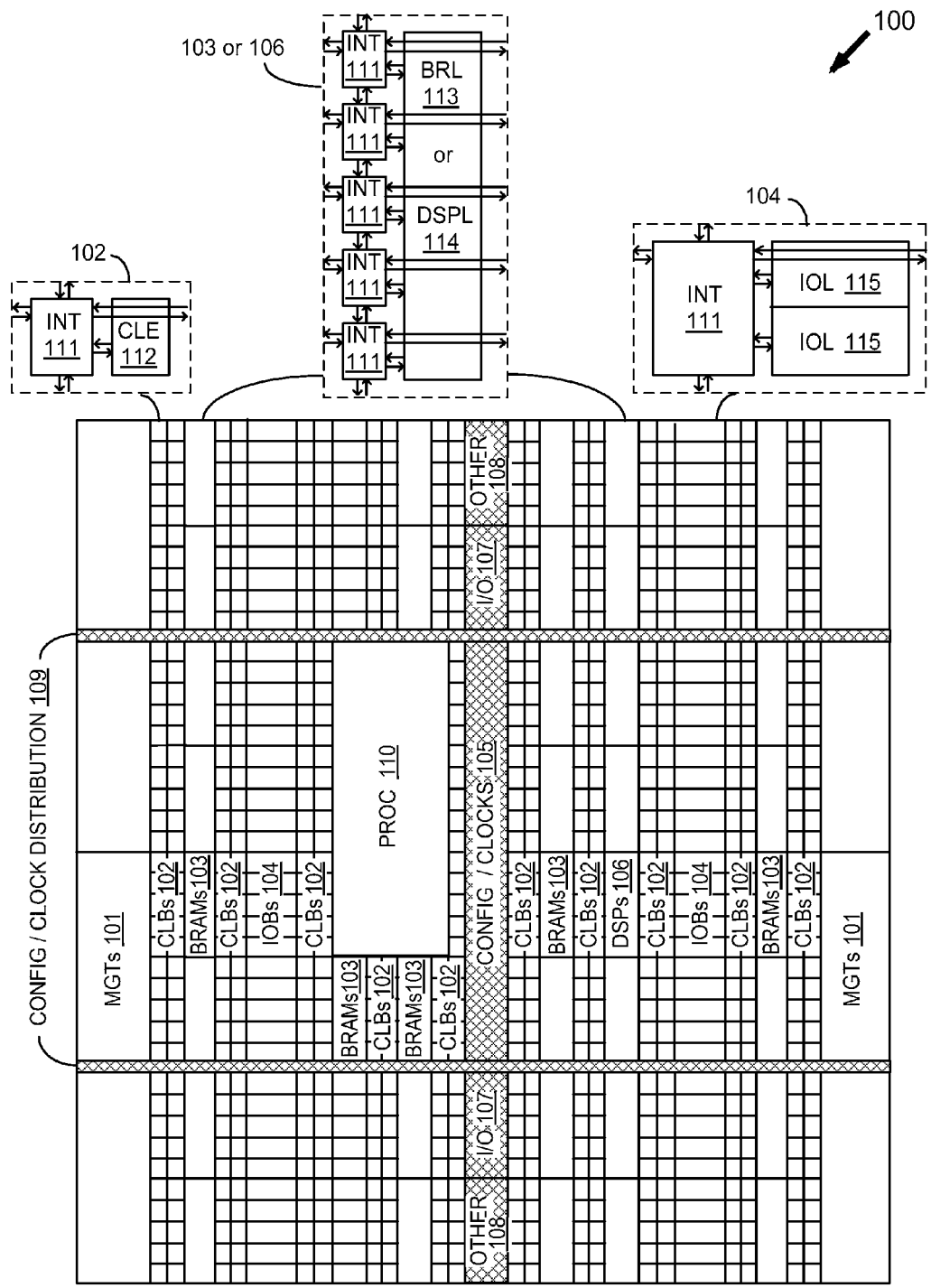
FIG. 1 illustrates an exemplary Field Programmable Gate Array (FPGA) architecture.

As noted above, advanced FPGAs can include several different types of programmable logic blocks in the array. For example, FIG. 1 illustrates an FPGA architecture 100 that includes a large number of different programmable tiles including multigigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 typically are not confined to the area of the input/output logic element 115.

In the pictured embodiment, a columnar area near the center of the die (shown shaded in FIG. 1) is used for configuration memory cells, clock, and other control logic. Horizontal areas 109 extending from this column are used to distribute the clocks and configuration signals across the breadth of the FPGA. For example, the various phase variants of clock signals generated by the DCMs of the FPGA may be distributed to various user logic regions that may be configured across the breadth of the FPGA. Additionally, repeater cells (not shown) are utilized within the shaded areas of FIG. 1 to provide driver functionality to one or more arrays of configuration memory cells. For example, an array of configuration memory cells may include a number, e.g., 60, of configuration memory cells that are required to distribute the necessary configuration logic to a pair of CLBs 102.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA, more than one adjacent column of CLBs are typically included wherever the CLBs appear, to facilitate the efficient implementation of user logic, but the number of adjacent CLB columns varies with the overall size of the FPGA.

As discussed above, hardware/software based recovery mechanisms in accordance with the present invention are particularly useful when utilized in the FPGA as exemplified in FIG. 1, since configuration memory errors may be detected and mitigated by providing the correct configuration information to the PLD control points that define a particular design. Should the FPGA be implemented with processor 110, software based mechanisms, as discussed in more detail below, may additionally be employed at compile-time to facilitate error detection and correction procedures at run-time that are interoperable with the hardware functionality of the FPGA to protect the FPGA from soft errors caused, for example, by SEUs.

Figure 2:
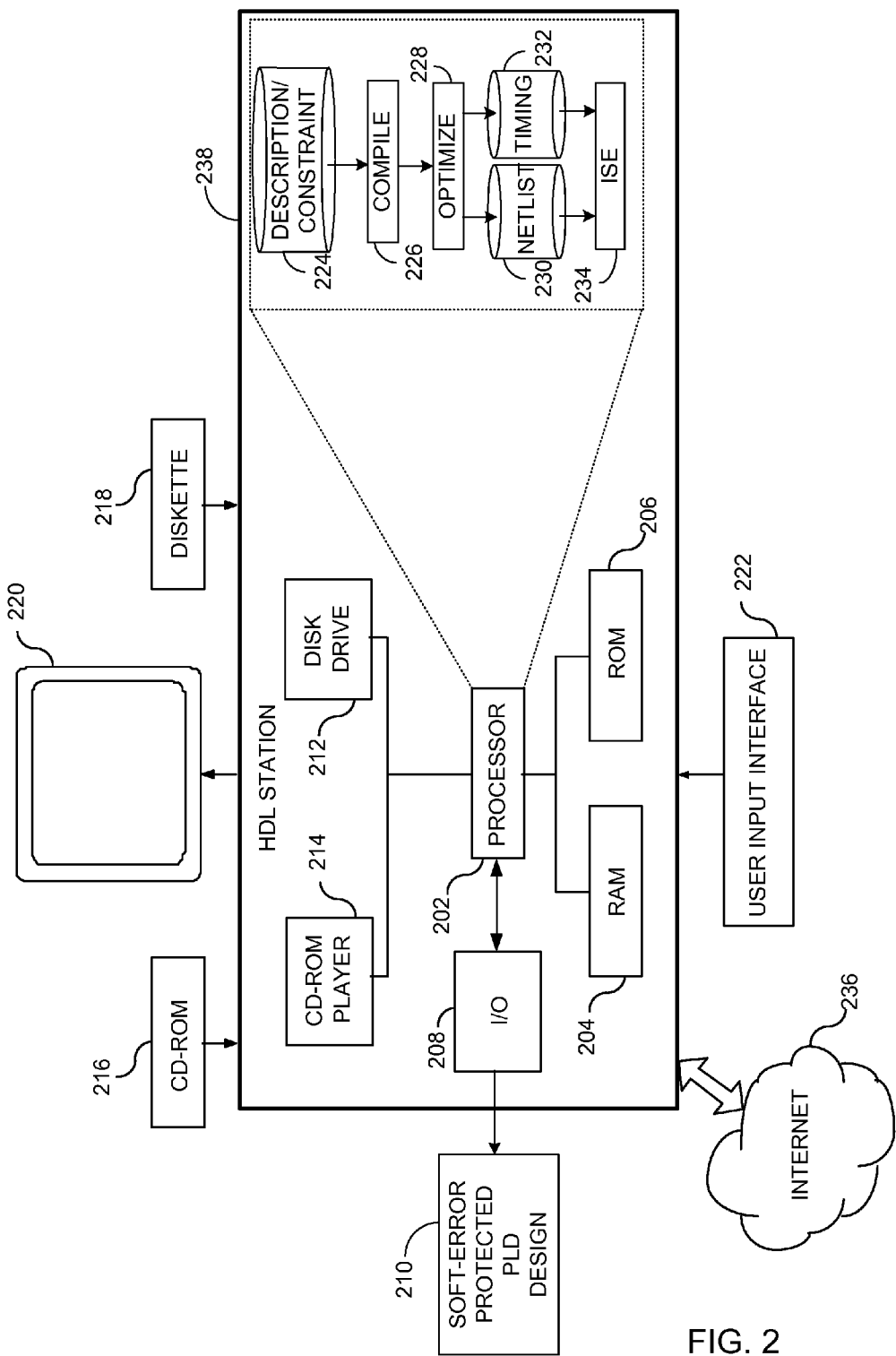
FIG. 2 illustrates an exemplary hardware description language (HDL) development station used to develop the functionality of the FPGA of FIG. 1.

The provisioning of soft-error protected integrated circuits (ICs), such as PLDs, in accordance with the various embodiments of the present invention may be realized by the designer at a hardware design language (HDL) development station as exemplified in FIG. 2. Verilog and VHDL represent two of the more popular HDL languages in use today, which may be used to define the structure of a soft-error protected, PLD design. In particular, HDL facilitates a description of the manner in which a design is decomposed into sub-blocks of logic and processor resources and further allows a description of the manner in which each sub-block of the design is to be interconnected.

The exemplary computing arrangement that is suitable for implementing soft-error mitigation in accordance with the various embodiments of the present invention includes HDL station 238, which includes a central processor (CPU) 202 coupled to random access memory (RAM) 204 and read-only memory (ROM) 206. The ROM 206 may also be other types of storage media to store programs, such as programmable ROM (PROM), electronically erasable PROM (EEPROM), etc. The processor 202 may communicate with other internal and external components through input/output (I/O) circuitry 208 to provide, for example, a configuration bit stream to define the one or more PLDs that may exist within soft-error protected PLD design 210.

As discussed in more detail below, soft-error protected PLD design 210 incorporates software and/or hardware resources of the PLD that have been implemented to mitigate soft-error induced failures. Should soft-error protected PLD design 210 implement processor 110 as discussed above in relation to FIG. 1, run-time check stops may be incorporated into the utilities that are to be executed by processor 110 to enhance reinstatement of PLD operation once the soft errors are detected/corrected.

At run-time, each check stop facilitates a snap shot of the hardware and/or software state of soft-error protected PLD design 210. The snap shot of the state of the PLD may then be stored into hardware and/or software based memory, where each snap shot may be triggered, for example, by the expiration of a pre-determined amount of time, the execution of a pre-determined number of execution cycles, etc. Should an error be detected, execution may be halted, soft errors may be corrected, and the executable state of the PLD that conforms to the most recently confirmed check-stop location may be re-established. As such, only those operations executed since the most recently confirmed check-stop location need to be re-executed, since reliable execution is substantially guaranteed prior to the most recently confirmed check-stop location.

HDL station 238 may include one or more data storage devices, including hard and floppy disk drives 212, CD-ROM drives 214, and other hardware capable of reading and/or storing information such as a DVD, etc. Software for facilitating the soft-error protected PLD design definitions in accordance with an embodiment of the present invention may be stored and distributed on a CD-ROM 216, diskette 218 or other form of media capable of portably storing information. These storage media may be inserted into, and read by, devices such as the CD-ROM drive 214, disk drive 212, etc.

The software for facilitating the soft-error protected PLD design definitions may also be transmitted to HDL station 238 via data signals, such as being downloaded electronically via a network, such as Internet 236. HDL station 238 is coupled to a display 220, which may be any type of known display or presentation screen, such as LCD displays, plasma displays, cathode ray tubes (CRT), etc. A user input interface 222 is provided, including one or more user interface mechanisms such as a mouse, keyboard, microphone, touch pad, touch screen, voice-recognition system, etc.

Processor 202 may be used to execute core synthesis tools 224-234 to aid in the minimization and optimization of the equations extracted from the HDL files. For example, description/constraint files 224 may provide, among other definitions, a description of the pin locations and associated functions that relate to processor 110 of FIG. 1. Compiler 226 parses through the HDL behavioral source code and description/constraint files 224 to extract known functions, e.g., arithmetic functions, multiplexers, memories, etc., that may be implemented within soft-error protected PLD design 210. Compiler 226 may also compile the source code that is to be executed by processor 110, should processor 110 be implemented within soft-error protected PLD design 210.

Optimize block 228, net list 230, timing 232, and integrated software environment (ISE) block 234 each interoperate to formulate a design that is substantially dependent upon the intended PLD target's architecture and context. The context, for example, may influence inter-function optimizations such as replication, merging, re-timing, and pipelining. The context may be defined by the timing requirements and topology of the design. Once the design is synthesized, it may be realized within soft-error protected PLD design 210, portions of which are exemplified by FIGS. 3-6 as discussed in more detail below.

Figure 3:
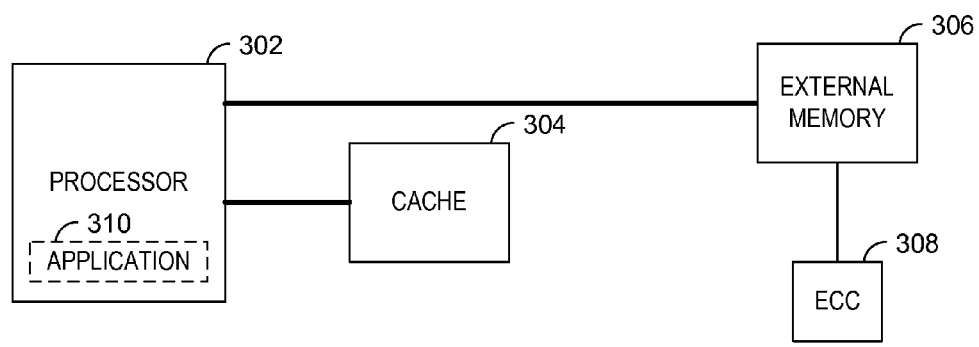
FIG. 3 illustrates an exemplary cache parity error protection block in accordance with one embodiment of the present invention.

Turning to FIG. 3, for example, a cache parity error protection block in accordance with one embodiment of the present invention is exemplified. Processor 302 corresponds to processor 110 as may be implemented within FPGA 100 as discussed above in relation to FIG. 1. Application 310 incorporates functionality that is responsive to an interrupt that is generated by cache 304 when any particular access to cache 304 results in a parity error. Application 310, for example, incorporates an interrupt service routine (ISR) that interoperates with cache 304 to detect/correct bit errors contained within cache 304.

In response to a parity error interrupt, as may be generated by cache 304 when memory access to cache 304 results in a parity error, the ISR of application 310 halts execution of processor 302 by pushing the cache access command and related register/control content to the processor stack of processor 302. In such an instance, the processor stack behaves as a check-stop data storage location, which is later used to reinstate the control flow of processor 302 once the soft error(s) are corrected. Next, the ISR of application 310 causes a portion, or all, of the contents of cache 304 to be overwritten with the corresponding mirror image of data contained within external memory 306.

Once a portion, or all, of the contents of cache 304 are flushed with the corresponding ECC 308 protected contents of external memory 306, the ISR of application 310 subsequently returns control flow back to processor 302 by popping the cache access command and related register/control content from the processor stack of processor 302. It can be seen, therefore, that the ISR of application 310 interoperates with hardware, i.e., cache 304 and external memory 306, to detect and correct soft parity errors that may be contained within cache 304.

Figure 4:
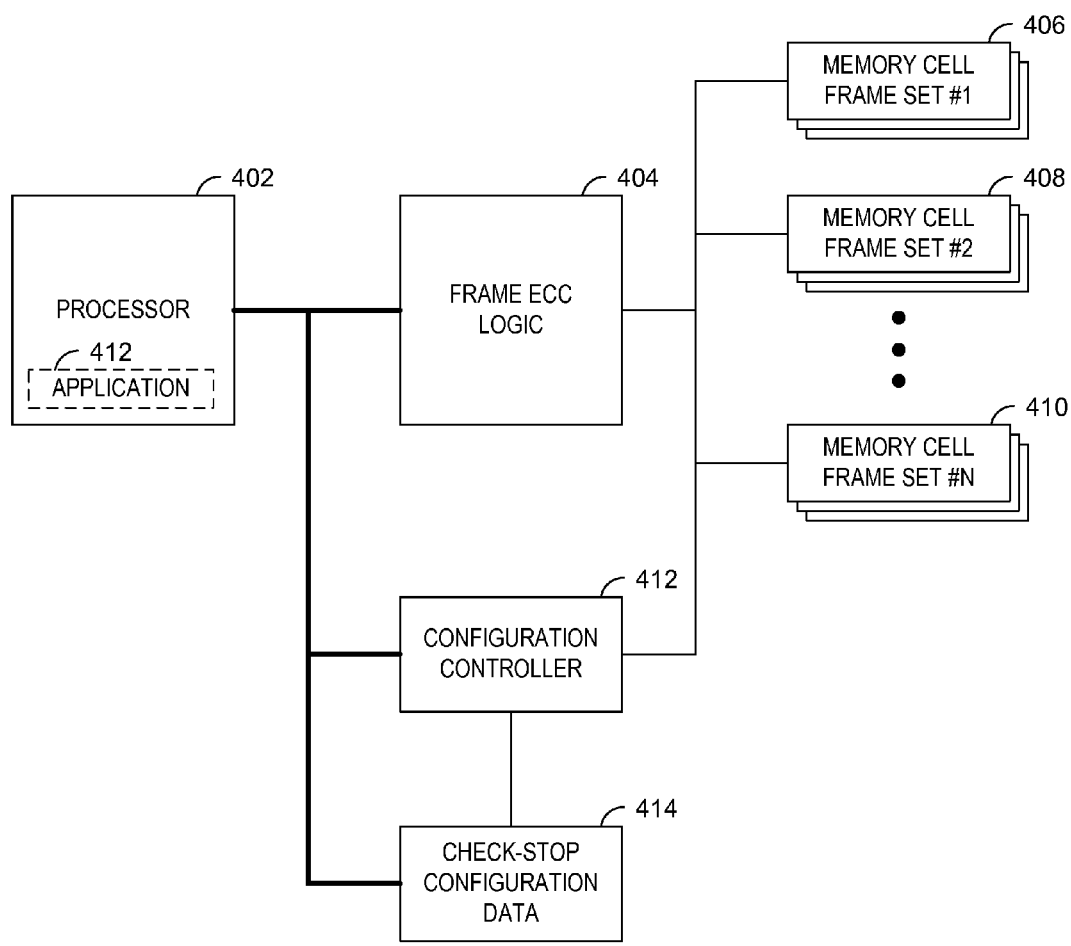
FIG. 4 illustrates an exemplary configuration memory protection block in accordance with one embodiment of the present invention.

Turning to FIG. 4, an alternate embodiment of a portion of soft-error protected PLD design 210 is exemplified. In particular, processor 402 and application 412 interoperate with frame ECC logic 404 to mitigate soft errors contained within memory cell frame sets 406-410.

Memory cell frame sets 406-410 are sets of memory cell frames that are tiled about FPGA 100 of FIG. 1, whereby each memory cell frame set represents an entire row of configuration memory cells. For example, the first memory cell frame of memory cell frame set 406 configures the first column of the first row of configuration memory cells within the configuration memory space of FPGA 100, the second memory cell frame of memory cell frame set 406 configures the second column of the first row of configuration memory cells within the configuration memory space of FPGA 100, and so on. Memory cell frame sets 408-410 are similarly arranged, such that memory cell frame set 408 configures the multiplicity of columns contained within the second row of the configuration memory space and memory cell frame set 410 ultimately configures the multiplicity of columns contained within the last row of the configuration memory space.

The height of each frame of memory cells is determined by the particular generation of PLD. Earlier FPGAs, for example, require the height of the configuration memory cell frames to be equal to the height of the device itself. More recent FPGA generations, however, divide the height of the device into two or more rows, whereby each configuration memory cell frame is mapped into a configuration memory cell column and a configuration memory cell row as discussed above. In such an instance, a single frame of configuration data is addressed to a particular column and row within the configuration memory space, whereby each single frame of configuration data is comprised of, for example, 41, 32-bit data words for a total of 1312 bits per configuration memory frame. It is understood, however, that configuration memory frame sizes are device dependent and may be adapted to be any size as may be required by the particular device being configured.

Each memory cell frame is the smallest addressable segment of the configuration memory space. Therefore, all configuration operations are required to act upon whole memory cell frames. Furthermore, each memory cell frame is mapped into a portion of configurable logic that is bounded by a configuration memory cell column and a configuration memory cell row as discussed above.

As such, frame ECC logic 404 individually operates on each respective memory cell frame of each memory cell frame set 406-410 to ultimately detect bit errors that may be contained within the configuration memory space. In operation, frame ECC logic 404 may be instructed by application 412 during a check-stop operation to perform a readback operation of the configuration data bits previously loaded into each memory cell frame of memory cell frame sets 406-410 during an original configuration event. Frame ECC logic 404 then calculates a multiple bit syndrome value, e.g., a 12-bit syndrome value, using all configuration bits contained within the memory cell frame including the ECC bits.

If the configuration data bits have not changed since the initial configuration event, then the syndrome contains all zero valued bits and the memory cell frame is error free. The configuration data bits may then be written to check-stop configuration data 414 as configuration data bits that are confirmed correct and time-stamped as correct configuration data bits at the time that the check stop is executed. If, on the other hand, the syndrome is not equal to all zero valued bits, then the memory cell frame is not error free and an interrupt is then generated by frame ECC logic 404 to indicate that further action is to be taken.

Should an interrupt be generated by frame ECC logic 404, the ISR of application 412 is responsive to execute the actions that are necessary to correct the soft errors that are contained within the configuration memory space. First, the ISR receives the address of the memory cell frame that contains the error(s) from frame ECC logic 404. That is to say, in other words, that the particular memory cell frame containing the error(s) must first be located within the configuration memory space before corrective action may be taken. Next, as discussed in more detail below, the ISR must halt the control flow of processor 402 and find the most recent check-stop location in time that confirms that the erroneous memory cell frame was error free.

The ISR then determines the extent of the errors contained within the erroneous memory cell frame. That is to say, in other words, that the syndrome generated by frame ECC logic 404 contains information as to the bit location of the error(s) contained within the erroneous memory cell frame. Given that the number of erroneous bits contained within the erroneous memory cell frame does not exceed the capability of the syndrome, the ISR may instruct frame ECC logic 404 to toggle the logic state of each erroneous configuration data bit contained within the erroneous memory cell frame. If, on the other hand, the number of erroneous bits contained within the erroneous memory cell frame exceeds the capability of the syndrome, then the ISR instructs configuration controller 412 to execute a partial reconfiguration of the erroneous memory cell frame(s) by providing the address(es) of the erroneous memory cell frame(s) to configuration controller 412.

In a first embodiment, the partial reconfiguration may be accomplished subsequent to the original configuration event, whereby the erroneous memory cell frame of the PLD is reconfigured by configuration controller 412 while the remaining memory cell frames of the PLD retain their current configuration. In an alternate embodiment, partial reconfiguration may be accomplished dynamically, whereby the remaining memory cell frames of the PLD retain their current configuration and also remain active while the erroneous memory cell frame is being reconfigured by configuration controller 412.

The configuration data utilized by configuration controller 412 during partial reconfiguration of the erroneous memory cell frame is retrieved from check-stop configuration data 414, which as discussed in more detail below, is virtually guaranteed to remain error-free by virtue of the check-stop operation executed by application 412. In an exemplary embodiment, the configuration data width of configuration data words contained within check-stop configuration data 414 is equal to, e.g., 32 bits, since each configuration data word exhibits a data width of, e.g., 32 bits. In such an instance, configuration controller 412 executes the transfer of a single configuration data frame consisting of, e.g., 41, 32-bit data words, from check-stop configuration data 414 to the erroneous memory cell frame of the configuration memory space in, e.g., 41 clock cycles.

Once the erroneous memory cell frame(s) have been corrected, the ISR of application 412 resumes operation of the PLD. That is to say, in other words, that control flow is resumed at a point in time that corresponds to the time-stamp of the check stop where the erroneous memory cell frame was last confirmed to contain error-free configuration data.

Figure 5:
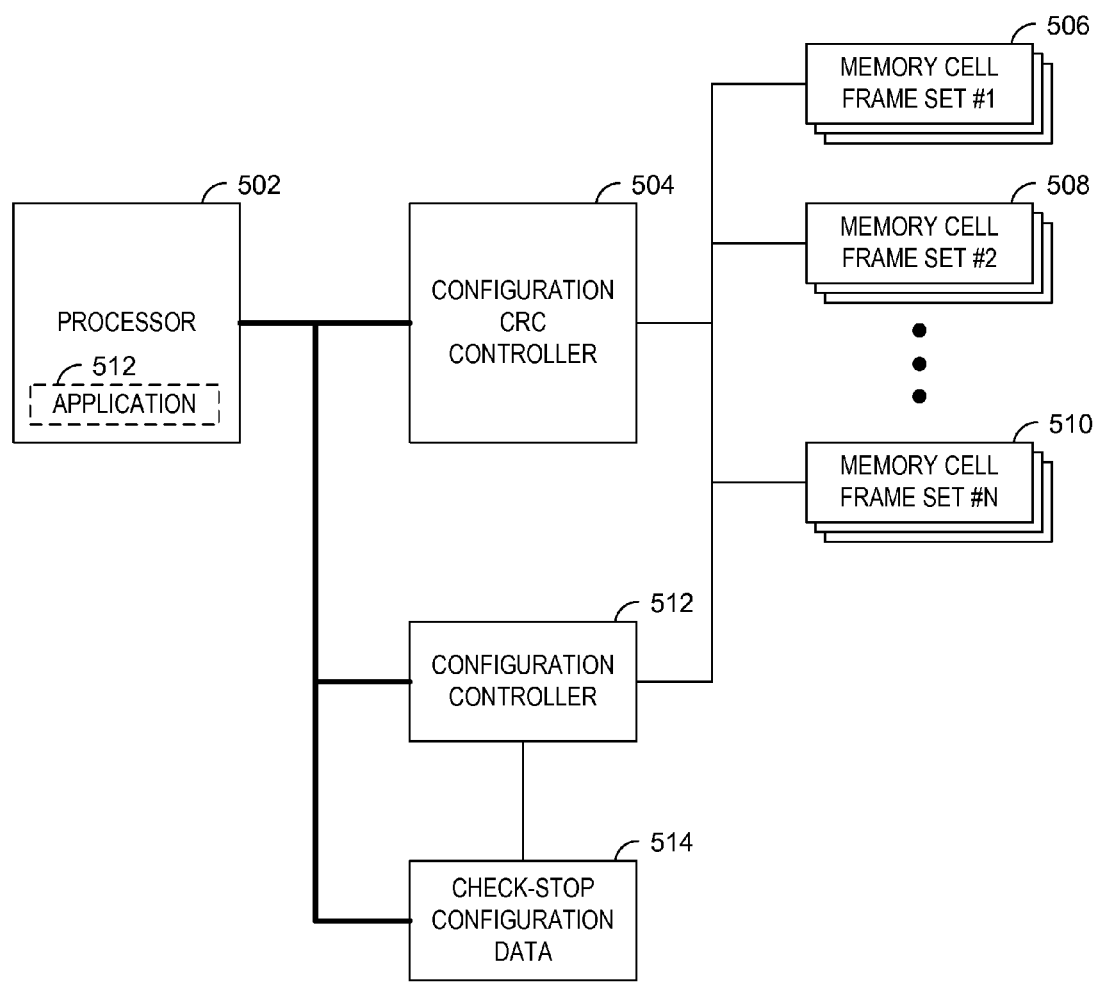
FIG. 5 illustrates an alternate embodiment of a configuration memory protection block in accordance with another embodiment of the present invention.

Turning to FIG. 5, an alternate embodiment of a portion of soft-error protected PLD design 210 is exemplified. In particular, processor 502 and application 512 interoperate with configuration CRC controller 504 to mitigate soft errors contained within memory cell frame sets 506, 508, 510. Soft-error protection operation is similar to that discussed above in relation to FIG. 4, except that configuration CRC controller 504 operates in a background, or watchdog, mode of operation. That is to say, in other words, that configuration CRC controller 504 is not instructed by application 512 to perform CRC operations, but rather cycles through each memory cell frame of memory cell frame sets 506-510 by calculating the CRC of each memory cell frame in a background mode of operation, i.e., a mode of operation that does not require instructions from application 512 to operate.

Should the CRC calculation result in a CRC error, an interrupt is generated by configuration CRC controller 504. The ISR of application 512 is then responsive to the interrupt to instruct configuration controller 512 to perform a partial reconfiguration of the erroneous memory cell frame(s) using check-stop configuration data 514 as discussed above in relation to FIG. 4.

Figure 6:
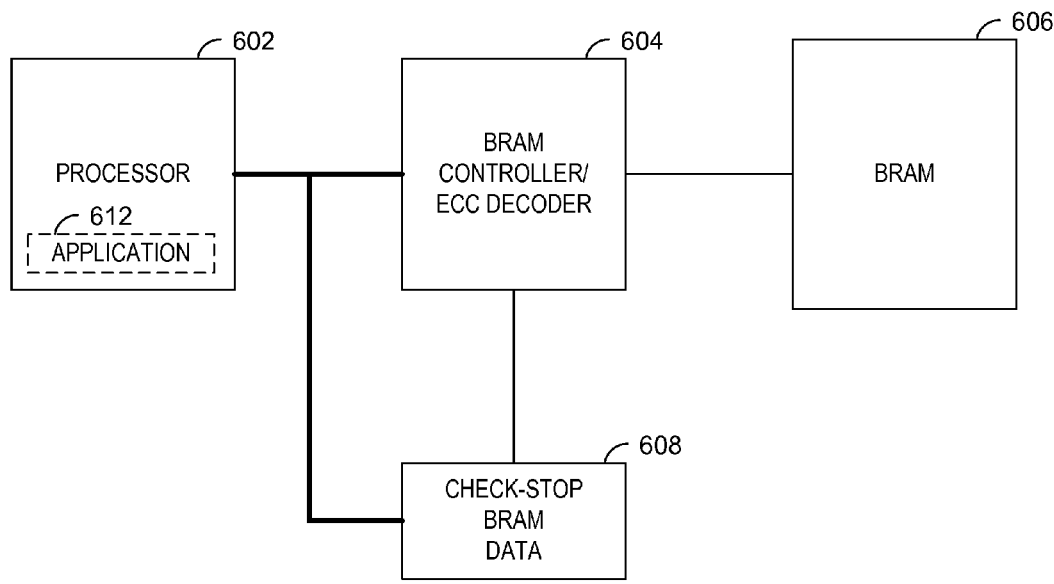
FIG. 6 illustrates exemplary random access memory block protection in accordance with an embodiment of the present invention.

Turning to FIG. 6, an alternate embodiment of a portion of soft-error protected PLD design 210 is exemplified. In particular, processor 602 and application 612 interoperate with BRAM controller 604 to mitigate soft errors contained within BRAM 606. As discussed above, BRAM 606 is a block of dual-port, random access memory that may be configured to exhibit a variety of memory depths and memory word widths.

BRAM 606 may also be configured as ECC memory, whereby a portion of each data word read from BRAM 606 contains ECC bits that are utilized by ECC decoder 604 to detect/correct errors in each data word returned as a result of each read operation from BRAM 606. In such an instance, ECC decoder 604 generates an error status that is indicative of the read result, which either indicates that no errors were detected, or that errors were detected and corrected. The error status also indicates the bit position(s) of the corrected bits within the corrected data word that is returned as a result of the read operation. If errors are detected/corrected, then BRAM controller 604 issues an interrupt after the read operation is complete.

Should an interrupt be generated by BRAM controller 604, the ISR of application 612 is responsive to execute the actions that are necessary to correct the soft errors that are contained within BRAM 606. First, the ISR receives the address of the data word that contains the error(s) from BRAM controller 604. That is to say, in other words, that the particular data word containing the error(s) must first be located within BRAM 606 before corrective action may be taken. Next, as discussed in more detail below, the ISR must halt the control flow of processor 602 and find the most recent check-stop location in time that confirms that the erroneous data word contained within BRAM 606 was error free.

The ISR then determines the extent of the errors contained within the erroneous data word. That is to say, in other words, that the data word provided by BRAM controller in response to the read operation of BRAM 606 only returns corrected data, but does not correct the erroneous data word that is contained within BRAM 606. As such, given that the number of erroneous bits contained within the erroneous data word does not exceed the capability of the syndrome generated by ECC decoder 604, the ISR may instruct BRAM controller 604 to toggle the logic state of each erroneous data bit contained within the erroneous data word. Conversely, the ISR may simply perform a write operation into BRAM 606 using the same data word received during the read operation from BRAM 606, since the data word returned by the read operation is itself corrected. If, on the other hand, the number of erroneous bits contained within the erroneous data word exceeds the capability of the syndrome generated by ECC decoder 604, then the ISR instructs BRAM controller 604 to overwrite the entire erroneous data word contained within BRAM 606.

The data utilized by BRAM controller 604 during the overwrite of the erroneous data word contained within BRAM 606 is retrieved from check-stop BRAM data 608, which as discussed in more detail below, is virtually guaranteed to remain error-free by virtue of the check-stop operation executed by application 612. Once the erroneous data word(s) have been corrected, the ISR of application 612 resumes operation of the PLD. That is to say, in other words, that control flow is resumed at a point in time that corresponds to the time-stamp of the check stop where the erroneous data word contained within BRAM 606 was last confirmed to contain error-free data.

In each of the embodiments described in relation to FIGS. 3-6, it is noted that express correction of the soft error may not necessarily be required. Instead, the soft error may be corrected simply by reinstating the state data collected during the most recently confirmed check-stop execution prior to reinstatement of the control flow of the processor. That is to say, in other words, that whatever soft errors may exist at the time of interrupt may be corrected simply by overwriting the state of the PLD with a previously confirmed state of the PLD collected during the most recently executed check stop.

Figure 7:
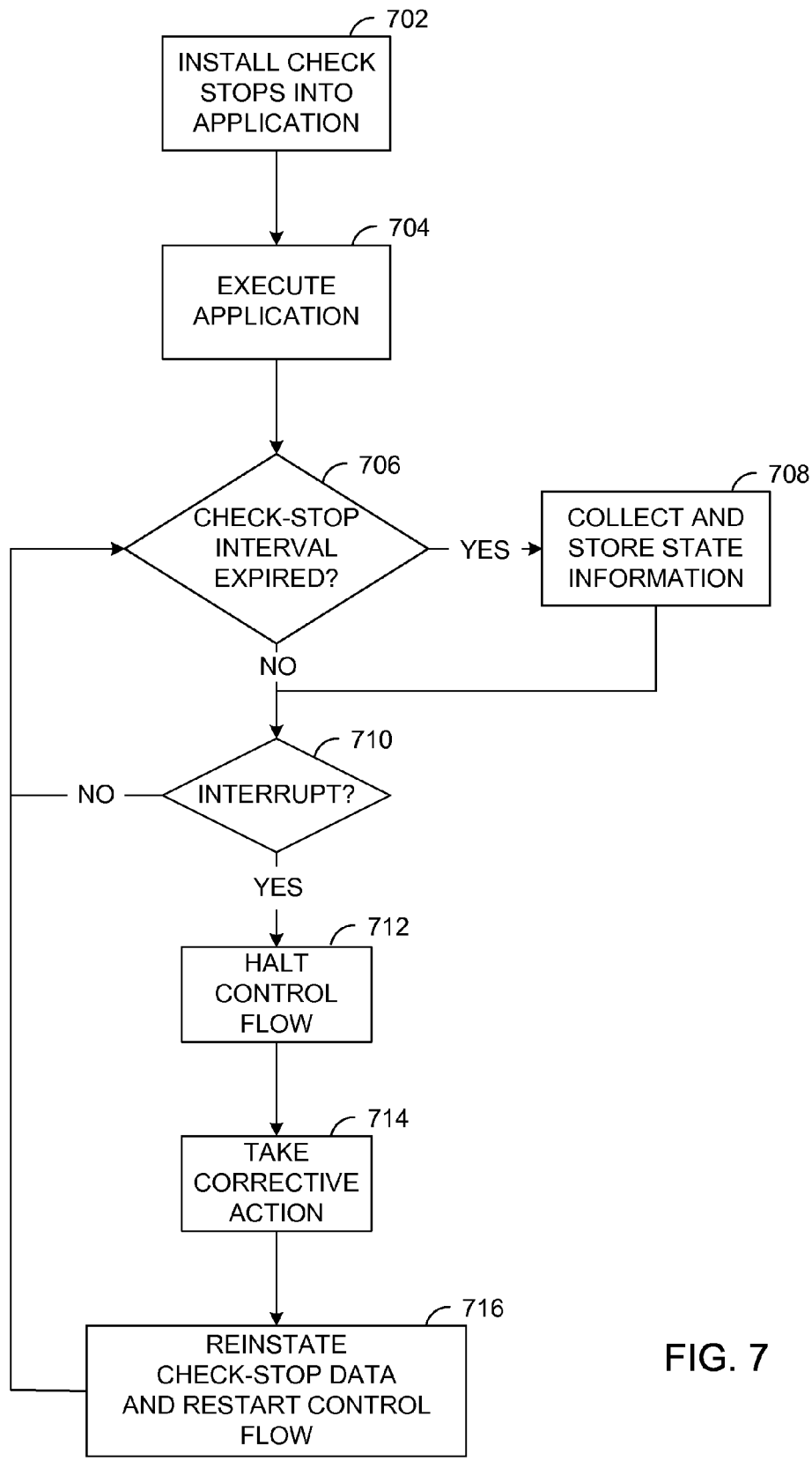
FIG. 7 illustrates an exemplary flow diagram of soft-error detection and correction in accordance with an embodiment of the present invention.

Turning to FIG. 7, a flow diagram is exemplified that illustrates check-stop based error detection/correction in accordance with an embodiment of the present invention. Check-stop algorithms are first installed into each respective source code definition of the processor executable application in step 702 as required. The application and associated check stops are then compiled and executed in step 704 at run-time, whereby once the check-stop interval expires, as determined in step 706, the check-stop operation of step 708 is executed.

The check-stop operation of step 708, as defined by the respective check-stop source code, is generally required to collect, at the expiration of the programmable interval as determined in step 706, all variables, register contents, configuration data, memory contents, and any other state information that may be required by the ISR of applications 412, 512, and 608 to reinstate control flow to their respective processor after soft errors have been detected and optionally corrected. The collected state information may then be stored into check-stop data storage locations, e.g., 414, 514, and 608, and time-stamped for future access by the ISR prior to reinstating the control flow.

The check-stop operation of step 708 may, for example, perform a readback operation, as discussed above in relation to FIGS. 4 and 5, of the configuration memory space of the integrated circuit. Alternately, the check-stop operation of step 708 may instead read the contents of block memory from BRAM 606, as discussed above in relation to FIG. 6. In either instance, the retrieved contents are stored into check-stop configuration data 414, 514, or check-stop BRAM data 608, respectively, and appropriately time-stamped as check-stop data that is confirmed to be correct as of the time indicated by the time-stamp.

The duration between successive check-stop execution intervals may be defined as any interval that conforms to the particular environment that the PLD is operating within. For example, in an environment with a high rate of SEU occurrence, the duration between each check-stop execution may be programmed to a relatively small amount of time. Conversely, in an environment with a low rate of SEU occurrence, the duration between each check-stop execution may be programmed to a relatively large amount of time. Interval durations may be programmed as virtually any increment of time, such as the amount of time required to execute a programmable number of processor instructions, a programmable number of rising/falling edge occurrences of the system clock, or simply a programmable time duration expressed in fractions to multiples of seconds.

In step 710, a determination is made as to whether an interrupt has occurred, such as exemplified by the hardware interrupts initiated from: 1) frame ECC logic 404 as discussed above in relation to FIG. 4; 2) configuration CRC controller 504 as discussed above in relation to FIG. 5; and/or 3) BRAM controller 604 as discussed above in relation to FIG. 6. If an interrupt has occurred, then the ISR halts control flow as in step 712 and corrective action is taken as in step 714.

Given that a soft error has occurred in the configuration memory space of the PLD, for example, the ISR may instruct frame ECC logic 404 to toggle the logic state of each erroneous configuration data bit contained within the erroneous memory cell frame as discussed above in relation to FIG. 4. Alternately, the ISR may instruct configuration controller 412 to execute a partial reconfiguration of the erroneous memory cell frame(s) by providing the address(es) of the erroneous memory cell frame(s) to configuration controller 412 in response to the interrupt generated by frame ECC logic 404 as discussed above in relation to FIG. 4, or the interrupt generated by configuration CRC controller 504 as discussed above in relation to FIG. 5.

Given that a soft error has occurred within the BRAM of the PLD, on the other hand, the ISR may instruct BRAM controller 604 to toggle the logic state of each erroneous data bit contained within the erroneous data word as discussed above in relation to FIG. 6. Alternately, the ISR may instruct BRAM controller 604 to overwrite the entire erroneous data word contained within BRAM 606 with the corresponding data word contained within check-stop BRAM data 608.

Once the corrective action of step 714 has been executed by the ISR, the ISR resumes operation of the PLD. That is to say, in other words, that control flow is resumed at a point in time that corresponds to the time stamp of the check stop where error-free operation was confirmed to exist. Thus, only those operations executed since the most recently confirmed check stop need to be re-executed, since by operation of the soft error recovery mechanism provided herein, reliable execution is substantially guaranteed prior to the most recently guaranteed check stop.

Other aspects and embodiments of the present invention will be apparent to those skilled in the art from consideration of the specification and practice of the invention disclosed herein. For example, software-based ISRs may be replaced with their hardware equivalents, should processor 110 be absent from the PLD. In such an instance, hardware may be configured within the PLD to service the hardware interrupts generated as a result of soft-error upset detection/correction. It is intended that the specification and illustrated embodiments be considered as examples only, with a true scope and spirit of the invention being indicated by the following claims.

What is claimed is:

1. A method of detecting and correcting soft-error upsets within an integrated circuit, the method comprising:
   installing a plurality of check stops into a source code definition of a processor executable application;
   executing the processor executable application, the plurality of check stops of the processor executable application being executed at programmable time intervals;
   collecting state information related to the integrated circuit in response to execution of each of the plurality of check stops;
   wherein collecting state information includes collecting configuration data that defines functionality in programmable resources and that defines circuit connections in programmable interconnect of the integrated circuit;
   halting the processor executable application in response to an interrupt, the interrupt being generated in response to detecting a soft-error upset;
   correcting the soft-error upset; and reinstating execution of the processor executable application, wherein execution is reinstated with state information collected during one of the executed plurality of check stops.

2. The method of claim 1, wherein the interrupt is generated in response to a cache access parity error.

3. The method of claim 2, wherein correcting the soft-error upset comprises overwriting a portion of cache memory with corresponding contents of external memory.

4. The method of claim 1, wherein collecting configuration data comprises:
performing a readback operation of a configuration memory space contained within the integrated circuit to obtain the configuration data from the configuration memory space; and
storing the configuration data into a check-stop configuration data memory space upon confirmation that the configuration data is correct.

5. The method of claim 4, wherein correcting the soft-error upset comprises:
detecting errors within the configuration data during the readback operation; and
toggling a logic state of each erroneous configuration data bit of the configuration memory space in response to the error detection.

6. The method of claim 4, wherein correcting the soft-error upset comprises:
detecting errors within the configuration data during the readback operation; and
performing a partial reconfiguration of the configuration memory space in response to the error detection, wherein configuration data used during the partial reconfiguration is retrieved from the check-stop configuration data memory space.

7. The method of claim 4, wherein correcting the soft-error upset comprises:
detecting errors within the configuration data during a background mode of operation, the background mode of operation being operative without interaction from the processor executable application; and
toggling a logic state of each erroneous configuration data bit of the configuration memory space in response to the error detection.

8. The method of claim 4, wherein correcting the soft-error upset comprises:
detecting errors within the configuration data during a background mode of operation, the background mode of operation being operative without interaction from the processor executable application; and
performing a partial reconfiguration of the configuration memory space in response to the error detection, wherein configuration data used during the partial reconfiguration is retrieved from the check-stop configuration data memory space.

9. The method of claim 1, wherein collecting state information comprises:
reading data from a random access memory block contained within the integrated circuit; and
storing the random access memory data into a check-stop random access memory data space upon confirmation that the random access memory data is correct.

10. The method of claim 9, wherein correcting the soft-error upset comprises:
detecting errors within the random access memory block while reading data from the random access memory block; and
toggling a logic state of the detected errors within the random access memory block in response to the error detection.

11. The method of claim 9, wherein correcting the soft-error upset comprises:
detecting errors within the random access memory block while reading data from the random access memory block; and
overwriting the detected errors within the random access memory block with data retrieved from the check-stop random access memory data space in response to the error detection.

12. A soft-error detection and correction system, comprising:
a processor contained within an integrated circuit, the processor being adapted to execute an application to gather a first set of data and a second set of data relative to a state of the integrated circuit at programmable time intervals;
a logic module coupled to the processor, the logic module adapted to interrupt execution of the application upon detection of an error contained within the second set of data; and
wherein the logic module comprises a configuration memory space controller contained within the integrated circuit, and the second set of data defines functionality in programmable resources and that defines circuit connections in programmable interconnect of the integrated circuit;
wherein the processor is further adapted to correct the error detected in the second set of data in response to the interruption of execution of the application.

13. The system of claim 12, wherein each time interval is programmed to be proportional to a number of system clock cycles executed by the integrated circuit.

14. The system of claim 12, wherein each time interval is programmed to be proportional to an amount of time required to execute a programmable number of instructions.

15. The system of claim 12, wherein the logic module comprises a cache contained within the integrated circuit, wherein the second set of data further includes data contained within the cache.

16. The system of claim 12, wherein the logic module comprises a random access memory block controller contained within the integrated circuit, wherein the second set of data further includes data contained within a random access memory block contained within the integrated circuit.

17. An integrated circuit, comprising:
programmable circuitry;
programmable interconnect circuitry;
a first memory block coupled to the programmable circuitry via the programmable interconnect circuitry;
a second memory block coupled to the first memory block;
a processor coupled to the first and second memory blocks via the programmable interconnect circuitry, the processor being adapted by an application executing on the processor to transfer portions of the first memory block into the second memory block at programmable intervals, the transferred portions being confirmed as correct and being time-stamped with a time indicative of the programmable interval;
interrupt logic coupled to the processor and adapted to halt execution of the application in response to a detection of an error within the first memory block; and
wherein the processor is further adapted to overwrite the first memory block with contents of the second memory block in response to the halted execution of the application.

18. The integrated circuit of claim 17, wherein the interrupt logic is further adapted to re-start execution of the application in response to overwriting the first memory block.

* * * * *